UNITED STATES PATENT OFFICE.

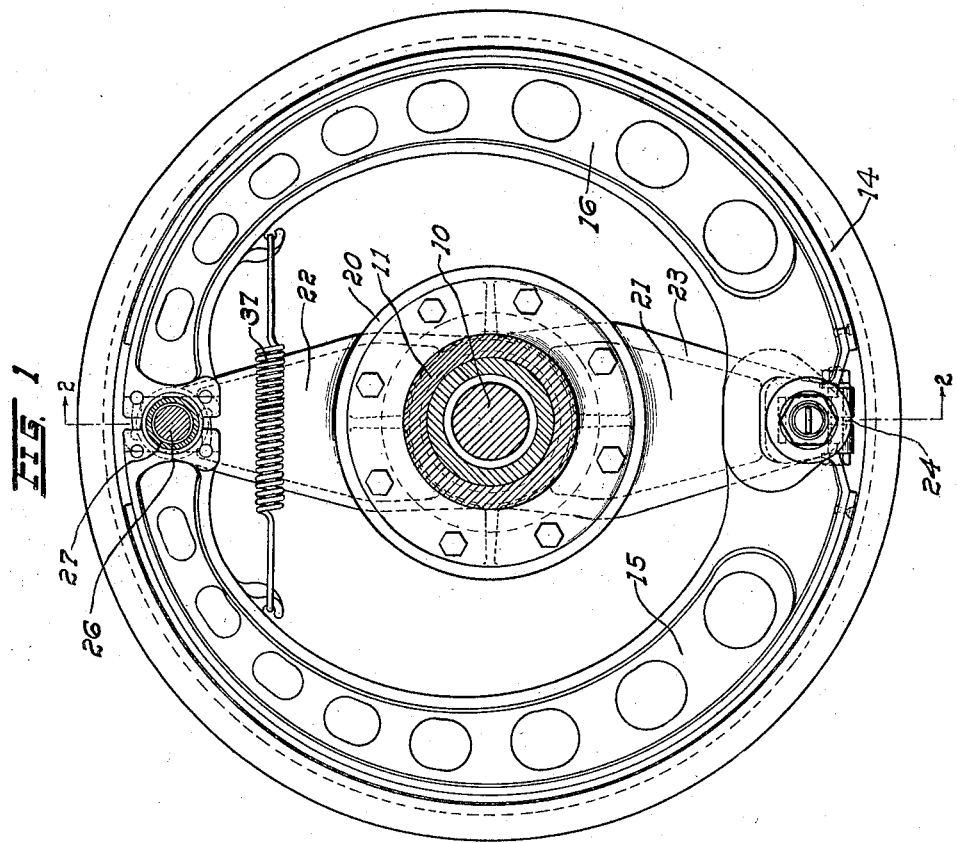
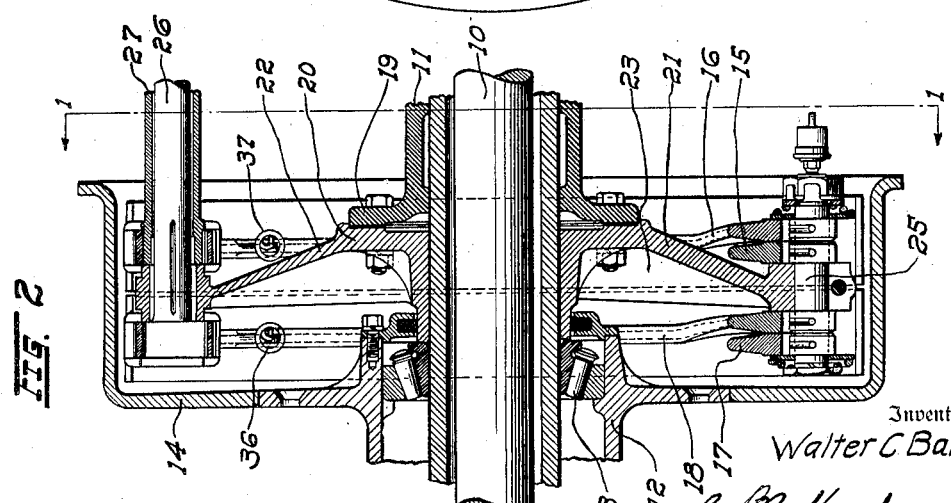

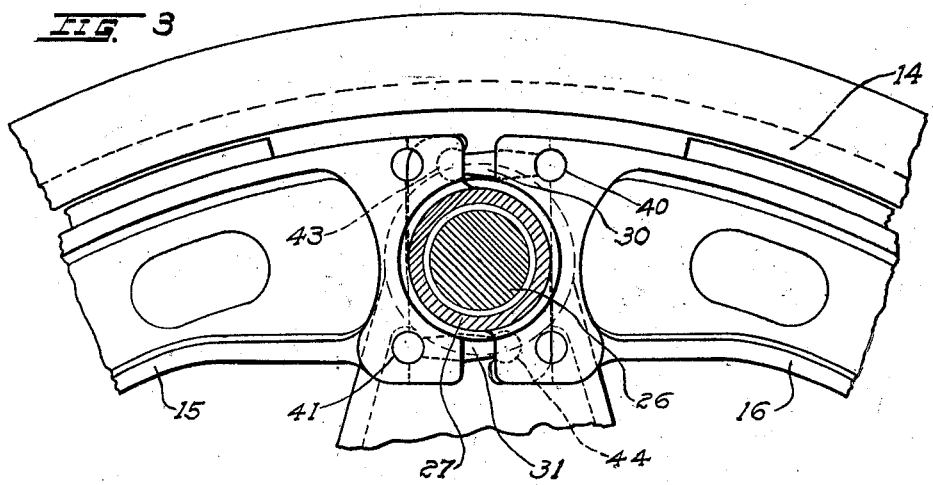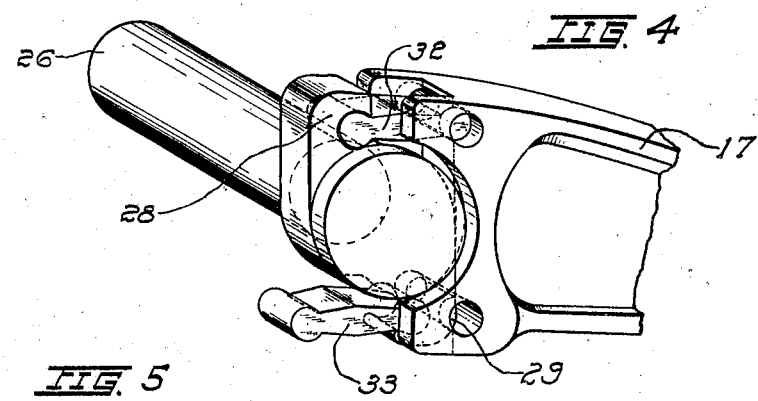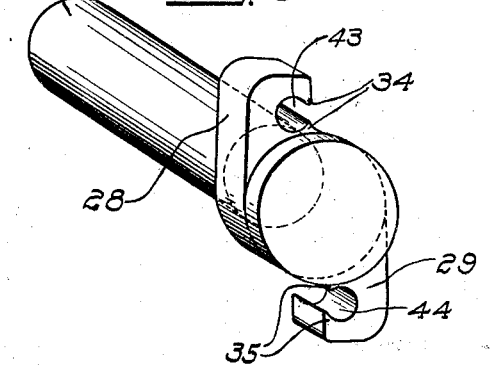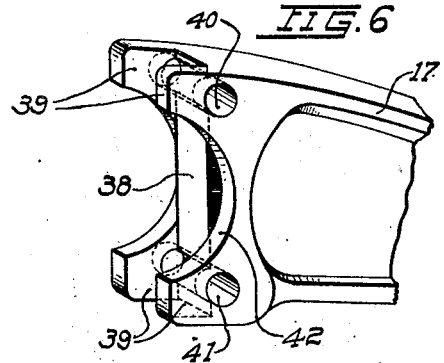

WALTER C. BAKER, OF CLEVELAND, OHIO, ASSIGNOR TO STANDARD PARTS COMPANY, OF CLEVELAND, OHIO, A CORPORATION OF OHIO.

BRAKE MECHANISM.

1,423,901.  Specification of Letters Patent.  Patented July 25, 1922.

Application filed March 21, 1919. Serial No. 284,083.

*To all whom it may concern:*

Be it known that I, WALTER C. BAKER, a citizen of the United States, and a resident of Cleveland, county of Cuyahoga, State of Ohio, have invented certain new and useful Improvements in Brake Mechanism, of which the following is a specification.

This invention relates to brake mechanism, and has for its object the provision of a brake, so arranged that neither end will be drawn away from the brake drum by the actuating mechanism. A further object is the provision of such an operating mechanism that the ends of the brake will be separated by forces acting in diametrically opposite directions and perpendicular to the line joining the point of application of force to said brake and the pivoted point about which such motion takes place, thus causing the parts of the brake to be engaged with the drum with equal force, and thereby improving the efficiency and durability of the brake. A further object consists in so proportioning the lever arms that the forces applied to the ends of the brake will be equalized. A still further object consists in reducing to a minimum the friction in transmitting power from the brake operating shaft to the brake. Other objects and features of novelty will be apparent from the following description, taken in connection with the accompanying drawing, in which:—

Figure 1 is an elevation, partly in section, of the brake and its operating mechanism;

Figure 2 is a section on line 2—2 of Figure 1;

Figure 3 is an enlarged fragmentary detail of the expanding mechanism;

Figure 4 is a perspective view of the same, one brake shoe being removed;

Figures 5, 6 and 7 are views, in perspective, of the various elements, showing more clearly the configuration of the coacting surfaces.

Around the driving axle 10, the tubular axle housing 11 extends and on the extension of this housing the hub 12 and the wheel, not shown, which is attached thereto, are rotatably mounted with the usual roller bearing construction, as shown at 13. The brake drum 14 is also fixed to the wheel so as to rotate therewith, and within the drum are interchangeable brake shoes 15, 16, 17 and 18, arranged in pairs.

Bolted or otherwise secured to the flange 19 of the axle housing, is a bracket 20, which has arms 21 and 22 extending in opposite directions and flanged, as at 23, to furnish a strong, light construction. Arm 21 is split, as shown at 24, and adapted to clamp pin 25, on which, at opposite sides of the arm, the pairs of brake shoes 15, 16, 17 and 18 are pivotally mounted. The details of the construction for holding these members in place and lubricating them constitute no part of this invention and any preferred construction may be employed as, for example, that shown in my Patent No. 1,132,541, issued March 16, 1915.

A brake operating shaft 26 for the pair of brake shoes 17 and 18 extends between the free ends of the brake shoes and is supported in the arm 22, and a tubular brake operating shaft 27 for the brake shoes 15 and 16 is mounted for rotation on the shaft 26. Upon each of these shafts, a brake operating head, comprising oppositely extending lever arms 28 and 29, is fixed, and these arms are adapted to exert a thrust on the free ends of the brake shoes, through spreader links 30, 31, 32 and 33, respectively, as more clearly shown in Figures 3 and 4, which spreader links are formed with an enlarged cylindrical head at each end, as shown in Figure 7, for engagement with the brake shoes. Sockets to receive the heads of the spreader links are drilled in each lever arm 28 and 29 of each brake operating head, and also in the free end of each brake shoe, it being noted that two such sockets are formed in each brake shoe, so that said shoes will all be identical in construction and, therefore, interchangeable. The sockets in the lever arms 28 and 29 are formed of sufficient depth to provide lips 34 and 35, which will limit the pivotal motion of the spreader links and prevent their displacement longitudinally. Springs 36 and 37 are connected respectively to the pairs of brake shoes near their free ends, to normally hold the shoes in retracted position, their motion to such position being limited by the engagement of the free ends of the shoes with flat faces formed on the rear sides of the brake operating lever arms.

The free ends of the brake shoes are formed as most clearly shown in Figure 6, being provided with an end face 38, and lugs 39 extending beyond the end face at each side and edge of the shoe, and adapted to hold the spreader links from lateral displacement when the parts are assembled. These lugs 39 being positioned on opposite sides of the lever arms 28 and 29, the ends of the brake shoes will be held by the lever arms from movement axially of the drum. The sockets 40 and 41, for the heads of the spreader links, are formed by drilling laterally through the brake shoe, and between the lugs at each side of the shoe a semicircular transverse opening is formed, as shown at 42, to permit assembly around brake operating shafts 26 and 27. It is desired to apply forces to the brake shoes which are inversely proportional to the lever arms of such forces about the pivot point of the brake shoes, to obtain equal moments of force about the pivot, at the instant the brake shoes engage the drum, thus compensating for the fact that the points of application of the forces to the brake shoes are at unequal distances from their common pivot. To obtain this end, the sockets 43 and 44, in the head of each operating shaft, are so placed with relation to the axis of the shaft as to vary the effective lever arms of the forces applied along the longitudinal central axes of the spreader links 32 and 33. However, it is preferred, as shown in the present construction, to utilize spreader links of the same length, so that they will be interchangeable, and the desired effective lever arms of the forces are obtained by forming socket 43 at a slightly greater distance from the axis of the shaft than socket 44, as most clearly shown in Figure 3. The spreader links 30, 31, 32 and 33 are so positioned that they will be moved longitudinally and will extend perpendicular to the line joining the pivot point about which the brake shoes rotate and the axis of the brake operating shaft, at that point in their movement at which the brake shoes first engage the drum, and will be moved substantially longitudinally and extend substantially perpendicular to that line at all times. This construction provides a direct thrust on the ends of the brake shoes, which will have no tendency to bend the same, and reduces the friction between the brake operating mechanism and the brake shoe to a minimum. It is understood that as the parts move to engage the brake shoes against the drum, the angular relation of each spreader link to both the operating head and the brake shoe, will be slightly changed, and the component of force transmitted to the brake shoe will change. However, in the structure described, the turning moments applied to the brake shoes will be substantially equal at all times, and the direction of such forces will be, at all times, substantially perpendicular to the line joining the point of application of the force to the brake shoe, to the pivot point of the brake shoe.

While I have illustrated and described a preferred form of mechanism embodying my invention, it will be understood that changes may be made in the details of construction, without departing from the spirit of the invention which is defined in the appended claims:

Having thus described my invention, what I claim is:

1. In brake mechanism, the combination of a brake drum, pivotally mounted brake shoes and operating means comprising a rotatable member having lever arms of unequal length and links cooperating with said brake shoes for exerting forces on the free ends of said brake shoes, inversely proportional to the lever arms of said forces about the pivot of the brake shoes.

2. In brake mechanism, the combination of a brake drum, brake shoes each pivoted at one end and having their other ends in proximity, and means for separating said other ends of the brake shoes comprising a rotatable member having lever arms thereon and compression members cooperating with said lever arms and the ends of said brake shoes, each of said members being at all times substantially perpendicular to the line joining its point of contact with the brake shoe to the pivot point of the brake shoe.

3. In brake mechanism, the combination of a brake drum, pivotally mounted brake shoes, means normally holding said brake shoes out of engagement with said drum, and operating means for engaging said shoes with said drum comprising a rotatable member having lever arms thereon and spreader links cooperating with said lever arms and said brake shoes, the motion of said shoes from operative position being limited by engagement with said lever arms.

4. In brake mechanism, the combination of a brake drum, pivotally mounted brake shoes, means normally holding said brake shoes out of engagement with said drum, and operating means for engaging said shoes with said drum comprising a rotatable member having lever arms thereon and spreader links connected with said lever arms and said brake shoes, the free ends of said shoes being adapted to cooperate with said lever arms when out of engagement with said drum and to be held by said arm against movement axially of the drum.

In testimony whereof I affix my signature.

WALTER C. BAKER.